United States Patent
Shibata

(10) Patent No.: US 11,580,194 B2
(45) Date of Patent: Feb. 14, 2023

(54) INFORMATION PROCESSING APPARATUS, INFORMATION PROCESSING METHOD, AND PROGRAM

(71) Applicant: NEC Corporation, Tokyo (JP)

(72) Inventor: Seiya Shibata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 359 days.

(21) Appl. No.: 16/759,858

(22) PCT Filed: Oct. 30, 2018

(86) PCT No.: PCT/JP2018/040258
§ 371 (c)(1),
(2) Date: Apr. 28, 2020

(87) PCT Pub. No.: WO2019/088072
PCT Pub. Date: May 9, 2019

(65) Prior Publication Data
US 2020/0301995 A1    Sep. 24, 2020

(30) Foreign Application Priority Data

Nov. 1, 2017  (JP) .............................. JP2017-211761

(51) Int. Cl.
*H04L 5/00* (2006.01)
*G06F 17/16* (2006.01)
*G06N 3/08* (2023.01)

(52) U.S. Cl.
CPC .............. *G06F 17/16* (2013.01); *G06N 3/08* (2013.01); *H04L 5/0051* (2013.01)

(58) Field of Classification Search
CPC ...... G06N 3/0454; G06N 3/063; G06N 3/082; G06N 3/04; G06N 3/08; G06N 3/084;
(Continued)

(56) References Cited

U.S. PATENT DOCUMENTS 9,668,699 B2 *  6/2017  Georgescu ............ G06T 7/0012
10,970,629 B1 *  4/2021  Dirac .................... G06N 7/005
(Continued)

FOREIGN PATENT DOCUMENTS

JP    H03-102567 A    4/1991
JP    2015-210747 A   11/2015
(Continued)

OTHER PUBLICATIONS

International Search Report for PCT Application No. PCT/JP2018/040258, dated Jan. 15, 2019.
Song Han et al., "EIE: Efficient Inference Engine on Compressed Deep Neural Network", International Symposium on Computer Architecture (ISCA) 2016, USA.

*Primary Examiner* — Eva Y Puente

(57) ABSTRACT

An information processing apparatus includes a sparse element detection part, a sparse location weight addition part, a multiplication part, a non-sparse data operation part, and an addition part. The sparse element detection part detects a predetermined sparse element from input data and outputs information about the sparse element. The sparse location weight addition part adds a first weight elements corresponding to the sparse element. The multiplication part multiplies an output of the sparse location weight addition part by the sparse element. The non-sparse data operation part performs an operation on non-sparse elements, each other than the sparse element in the input data. The addition part adds an output of the multiplication part and an output of the non-sparse data operation part.

20 Claims, 14 Drawing Sheets

(58) Field of Classification Search
CPC .... G06N 3/0481; G06N 3/086; G06N 3/0445; G06F 17/16; G06F 7/5443; G06F 9/30036; G06F 9/3887; G06F 9/3001; G06F 16/285; G06F 12/08; G06F 15/8046; H03M 7/3082; H03M 7/6023; H03M 7/702; H04L 5/0051; H04L 27/2636; H04L 1/0071; H04L 25/024; H04L 27/265; H04L 27/2602; H04L 27/2614; H04L 5/0005; H04W 56/001; H04W 74/0833; H04W 74/0841; H04W 74/0866; H04W 74/006
USPC ........................................................ 708/607
See application file for complete search history.

(56) References Cited

U.S. PATENT DOCUMENTS

| | | | |
|---|---|---|---|
| 2014/0219577 | A1 | 8/2014 | Hayashi |
| 2015/0206048 | A1 | 7/2015 | Talathi et al. |
| 2016/0328643 | A1* | 11/2016 | Liu ...................... G06N 3/0454 |
| 2019/0087713 | A1* | 3/2019 | Lamb ..................... G06N 3/084 |
| 2021/0397963 | A1* | 12/2021 | Jiang ..................... G06N 3/082 |

FOREIGN PATENT DOCUMENTS

| | | |
|---|---|---|
| JP | 2016-139176 A | 8/2016 |
| JP | 2017-509951 A | 4/2017 |
| WO | 2013/031083 A1 | 3/2013 |

* cited by examiner

FIG. 3A

INPUT DATA $$\begin{pmatrix} -1 & 0 & 0 \\ 2 & 0 & -1 \\ 0 & 2 & 1 \end{pmatrix}$$

FIG. 3B

WEIGHTS $$\begin{pmatrix} 2 & 2 & 0 \\ 0 & 0 & 1 \\ 1 & 2 & 0 \end{pmatrix}$$

US 11,580,194 B2

INFORMATION PROCESSING APPARATUS, INFORMATION PROCESSING METHOD, AND PROGRAM

REFERENCE TO RELATED APPLICATION

This application is a National Stage Entry of PCT/JP2018/040258 filed on Oct. 30, 2018, which claims priority from Japanese Patent Application 2017-211761 filed on Nov. 1, 2017, the contents of all of which are incorporated herein by reference, in their entirety.

FIELD

The present invention relates to an information processing apparatus, an information processing method, and a program.

BACKGROUND

In recent years, we have seen active developments in deep learning technologies. In deep learning, a deep neural network (DNN) is used. A DNN system using a DNN includes a plurality of layers. In each of the plurality of layers, a large number of matrix operations for input data is processed (a large number of matrix operations are applied).

The following considers, for example, application of a matrix operation in a convolutional neural network (CNN), as an example of a DNN system. In this case, the application of a matrix operation is that of filtering processing, which indicates a convolutional operation expressed by the following expression (1).

$$A = \Sigma(W_{(i,j)} \times X_{(i,j)}) \quad (1)$$

where $W_{(i,j)}$ is a weight constituting a filter, and $X_{(i,j)}$ is input data to each layer. As described above, a DNN system includes a plurality of layers, each of which is connected in cascade. Thus, input data to one layer is output data of a layer preceding to the one layer. The output data of a preceding layer in a DNN system is also referred to as an activation. In the expression (1), A is output data. That is, A is an activation. In the expression (1), i and j are both positive integers which are suffixes (indexes) that determine an individual weight and input data. As seen from the expression (1), a convolutional operation in the CNN is a sum of multiplication results per each matrix element.

As an example of the layers constituting a DNN system or a CNN system, there is fully connected layers (FC layers). In the FC layers, an inner product of an input value vector and a weight vector is calculated.

As described above, in a DNN system, etc., the above convolutional operation or vector inner product processing needs to be performed. A large number of multiply-add operations ($d = (a \times b) + c$) need to be performed in the convolutional operation, which incurs a problem that the DNN requires an enormous computation time.

As one means for solving this problem, there exists a technology using sparse property (sparsity) of activation. It is noted that "activation sparsity" is characteristics that zeros are many times contained in the activation which includes output values in each individual layer in an actual DNN system. That is, the activation sparsity indicates that, since an output value of one layer is used as an input value of a next layer, input data $X_{(i,j)}$ is often zero in the above convolutional operation.

When input data $X_{(i,j)}$ is zero, a result of multiplication processing using the input data ($W_{(i,j)} \times X_{(i,j)}$) also is zero. Thus, by detecting that input data $X_{(i,j)}$ is zero before multiplication processing, the multiplication processing can be omitted, as a result of which can reduce processing time of the DNN system. NPL 1 discloses an example of a DNN system that can achieve fast processing by using sparse property (sparsity) of activation (hereinafter, this DNN system will be referred to as a sparse DNN system).

FIG. 12 is a diagram illustrating a technology disclosed in NPL 1. FIG. 12 illustrates a simplified configuration of a sparse DNN system disclosed in NPL 1. As illustrated in FIG. 12, the sparse DNN system includes a zero detection part 91 and a non-zero value operation part 92.

FIG. 13 is a flowchart illustrating a general operation of the sparse DNN system having the configuration illustrated in FIG. 12.

First, the zero detection part 91 acquires output values (namely, activations) of a preceding layer as input data (step S401). Next, the zero detection part 91 detects locations (position or indexes) which take zero in the activation (detects zero elements in the input data; step S402). Next, the non-zero value operation part 92 performs a multiply-add operation only on the non-zero activations by using an output of the zero detection part 91 (performs a multiply-add operation on non-zero values in the input data and weight elements corresponding to locations of the non-zero values; step S403). Next, the non-zero value operation part 92 outputs an operation result (step S404).

In the sparse DNN system in FIG. 12, the non-zero value operation part 92 performs the multiply-add operations only on the non-zero activations. Thus, compared with a case in which multiply-add operations are performed on all the activations, the number of operations can be reduced. In addition, this sparse DNN system can acquire an operation result at high speed.

CITATION LIST

Non Patent Literature

NPL 1: Song Han, et. al., "EIE: Efficient Inference Engine on Compressed Deep Neural Network", International Symposium on Computer Architecture (ISCA) 2016.

SUMMARY

The disclosure of the above NPL is incorporated herein by reference thereto. The following analysis has been made by the present inventors.

As described above, while the sparse DNN system in NPL 1, etc. has an advantage in that the number of operations can be reduced, there are following problems in the sparse DNN system.

More specifically, there is a strict limitation to a range of application of the above sparse DNN system. This is because the sparse DNN system is presumed to use a specific function as an activation function applied to internal operation results in each layer of DNN, for achieving sufficiently faster processing by using the above sparse property. More specifically, the above sparse DNN system is presumed to use an activation function having characteristics that an output thereof is more likely to become zero. Thus, when a DNN system that uses an activation function whose output is more likely to be a value other than zero, the sparse property cannot be used effectively. In other words, in DNN systems that use an activation function whose output is more likely to become a non-zero value, speed up by using sparsity cannot be achieved in the technology disclosed in NPL 1, etc.

The following describes various kinds of activation functions. FIGS. 14A-14C illustrate various kinds of activation functions. FIG. 14A illustrates an example of a rectified linear unit (ReLU) function. FIG. 14B illustrates an example of an exponential linear unit (ELU) function. FIG. 14C illustrates an example of a hyperbolic tangent (tan h) function.

The ReLU function illustrated in FIG. 14A is a function whose output (y axis) becomes zero when an input value (x axis) is a negative value. Namely, the ReLU function is an example of an activation function having characteristics that an output is more likely to become zero. In contrast, the ELU and tan h functions in FIGS. 14B and 14C are each a function whose output is asymptotically equal to "−1" as an absolute value of the input value increases when the input value is negative. Namely, the output values of the ELU and tan h functions are more likely to become "−1", instead of zero.

From a mathematical point of view, output values of the ELU and tan h functions do not become equal to "−1" but can only be asymptotically equal to "−1". However, when these functions are implemented as computer programs or hardware circuits, each output value is required to be represented by finite bit numbers. Thus, the output values of the above functions could consequently become "−1". Alternatively, depending on implementation, "−1" can be more likely to be outputted, for example, by setting an output value to "−1" when an absolute value of an input value is equal to or more than a preset constant threshold when the input value is negative.

It is an object of the present invention to provide an information processing apparatus, an information processing method, and a program that can perform calculations at high speed in individual layer in a DNN system that uses an activation function that is more likely to output a non-zero value.

According to the present invention or a disclosed first aspect, there is provided an information processing apparatus, including: a sparse element detection part that detects a predetermined sparse element from input data and outputs information about the sparse element; a sparse location weight addition part that adds a plurality of first weight elements, each corresponding to the sparse element; a multiplication part that multiplies an output of the sparse location weight addition part by the sparse element; a non-sparse data operation part that performs an operation on a plurality of non-sparse elements, each being an element other than the sparse element in the input data; and an addition part that adds an output of the multiplication part and an output of the non-sparse data operation part.

According to the present invention or a disclosed second aspect, there is provided an information processing method, including:

detecting a predetermined a sparse element from input data and outputting information about the sparse element;

adding a plurality of first weight elements corresponding to the sparse element;

multiplying a sum of the plurality of first weight elements by the sparse element;

performing an operation on a plurality of non-sparse elements, each being an element other than the sparse element in the input data; and adding a multiplication result of a sum of the first weight elements and the sparse element and an operation result on the plurality of non-sparse elements.

According to the present invention or a disclosed third aspect, there is provided a program, causing a computer to execute processing including:

detecting a predetermined a sparse element from input data and outputting information about the sparse element;

adding a plurality of first weight elements corresponding to the sparse element;

multiplying a sum of the plurality of first weight elements by the sparse element;

performing an operation on a plurality of non-sparse elements, each being an element other than the sparse element in the input data; and adding a multiplication result of a sum of the first weight elements and the sparse element and an operation result on the plurality of non-sparse elements.

It is noted that this program can be stored in a computer-readable storage medium. The storage medium may be a non-transient storage medium such as a semiconductor memory, a hard disk, a magnetic storage medium, or an optical storage medium. The present invention may be embodied as a computer program product.

According to the present invention or the disclosed aspects, there are provided an information processing apparatus, an information processing method, and a program that can perform calculations at high speed in individual layers in a DNN system that uses an activation function that is more likely to output a non-zero value.

BRIEF DESCRIPTION OF THE DRAWINGS

FIGS. 3A and 3B are diagrams illustrating an operation of the multiply-add operation part according to the first example embodiment.

DETAILED DESCRIPTION OF EMBODIMENTS

Figure 1:
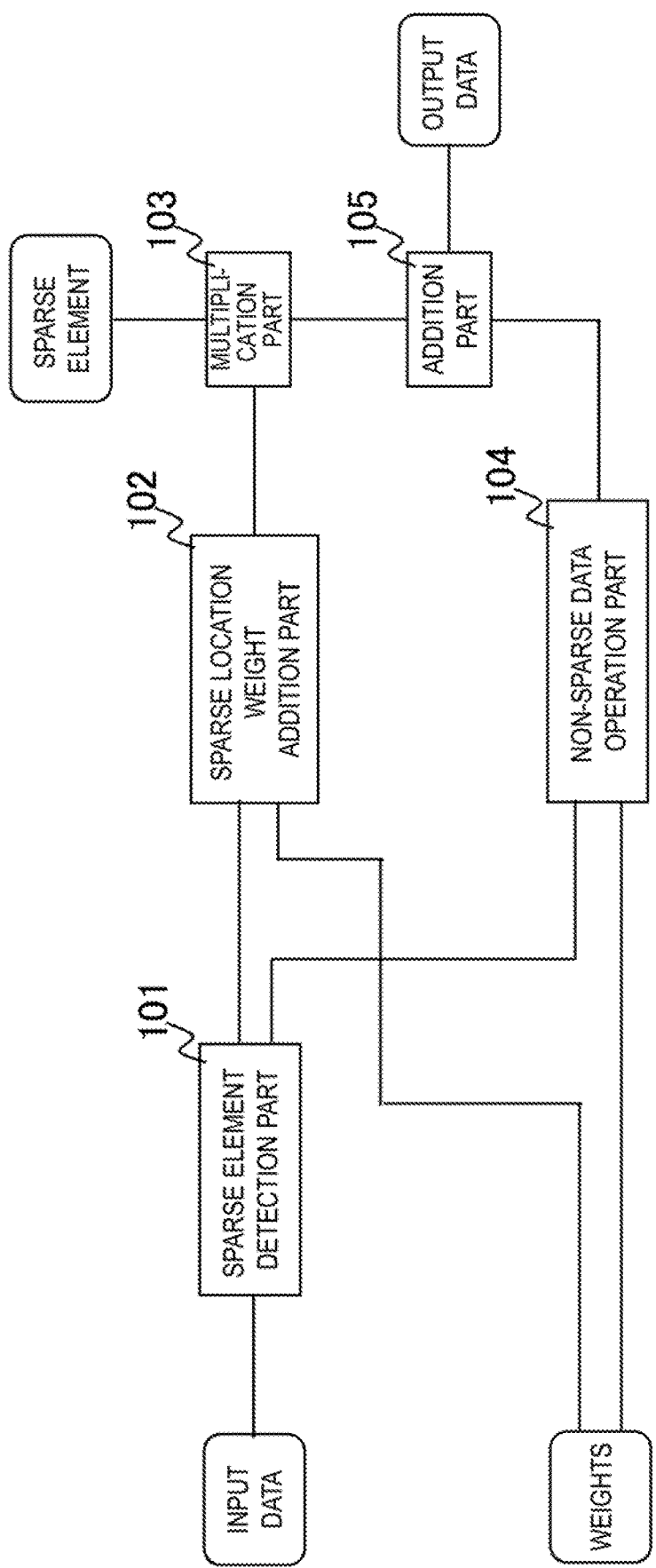
FIG. 1 is a diagram illustrating an outline of an example embodiment.

First, an outline of one of example embodiments will be described. Reference characters in the following outline denote various elements for the sake of convenience and are used as examples to facilitate understanding of the present invention. Namely, the description of the outline is not intended to indicate any limitations. An individual connection line between blocks in an individual drawing signifies both one-way and two-way directions. An arrow schematically is a diagram illustrating a principal signal (data) flow and does not exclude bidirectionality.

An information processing apparatus 100 according to an example embodiment includes a sparse element detection part 101, a sparse location weight addition part 102, a multiplication part 103, a non-sparse data operation part 104, and an addition part 105 (see FIG. 1). The sparse element detection part 101 detects a predetermined sparse element from input data and outputs information about the sparse element. The sparse location weight addition part 102 adds first weight elements corresponding to the sparse element. The multiplication part 103 multiplies an output of the sparse location weight addition part by the sparse element. The non-sparse data operation part 104 performs an operation relating to non-sparse elements, which are elements other than the sparse element in the input data. The addition part 105 adds an output of the multiplication part 103 and an output of the non-sparse data operation part 104.

The information processing apparatus 100 detects a sparse element having a predetermined non-zero value, calculates a sum of the weight elements corresponding to the sparse element, and multiplies the sum by the sparse element. In contrast, regarding elements other than the sparse element in the input data, the information processing apparatus 100 performs a normal operation (a multiply-add operation of input data and weights). As a result, even in a DNN system using an activation function that often outputs a non-zero value, by setting the value often outputted as the sparse element, a sparse DNN system capable of speeding up operation can be provided.

Hereinafter, more specific example embodiments will be described in detail with reference to drawings. In the individual example embodiments, like reference characters refer to like elements, and redundant description will be described.

First Example Embodiment

A first example embodiment will be described in more detail with reference to drawings.

Figure 2:
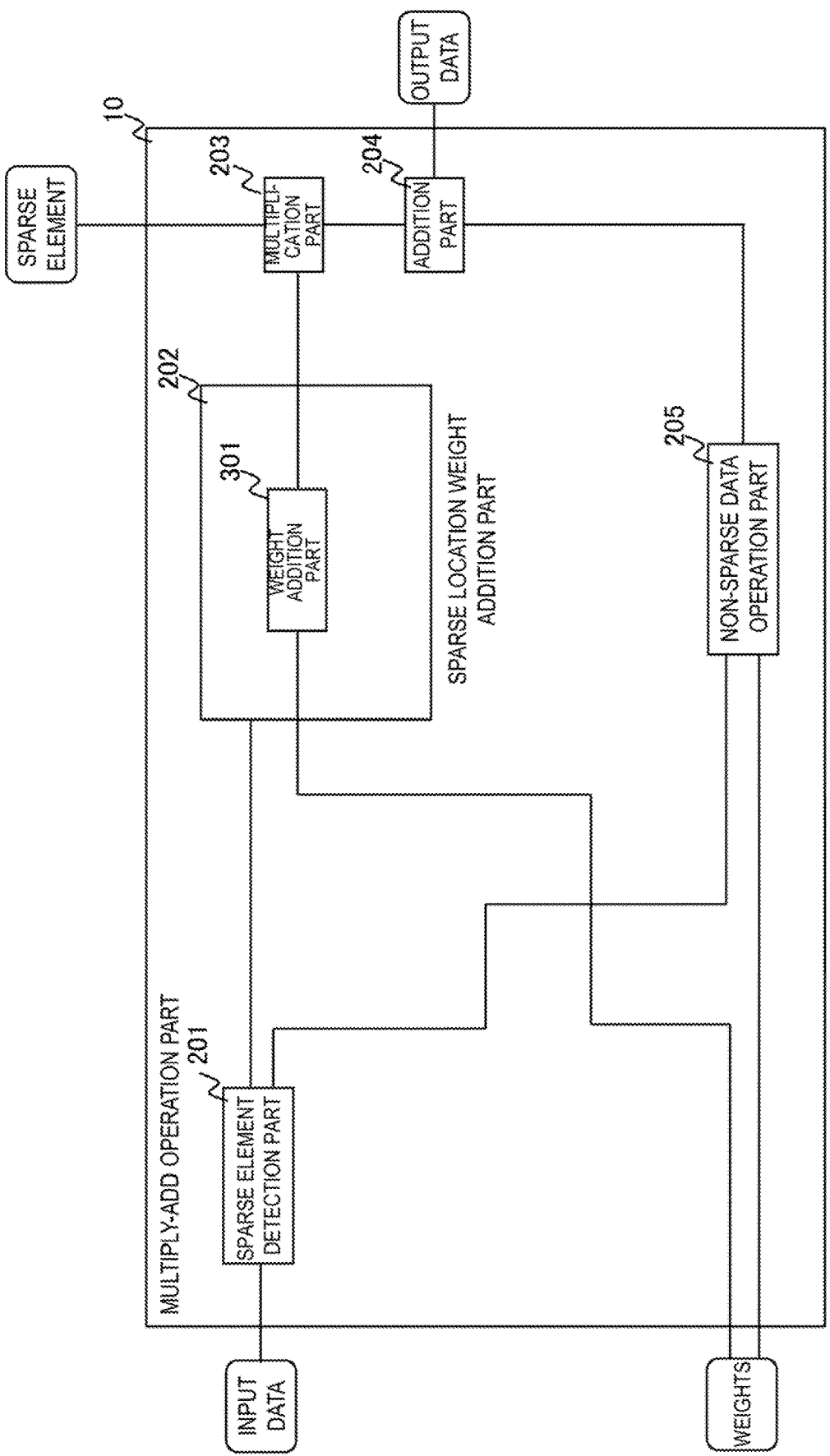
FIG. 2 is a diagram illustrating an example of an internal configuration of a multiply-add operation part included in an inference apparatus according to a first example embodiment.

FIG. 2 is a diagram illustrating an example of an internal configuration of a multiply-add operation part 10 included in an inference apparatus according to a first example embodiment. The multiply-add operation part 10 is a means (module) that acquires input data and weights and performs multiply-add processing by using the input data and weights.

More specifically, the multiply-add operation part 10 performs convolutional operations or vector inner product processing.

As illustrated in FIG. 2, the multiply-add operation part 10 includes a sparse element detection part 201, a sparse location weight addition part 202, a multiplication part 203, an addition part 204, and a non-sparse data operation part 205. In addition, the multiply-add operation part 10 includes a weight addition part 301 inside the sparse location weight addition part 202.

The following describes outline of operation of the above parts (various submodules).

The sparse element detection part 201 is a means that detects a predetermined sparse element from input data and outputs information about the sparse element. For example, the predetermined sparse element is a specific value such as "−1". It is noted that the sparse element is not limited to "−1" but may take another value. Namely, zero may be included as a candidate of the sparse element. A predetermined sparse element may be single, or a plurality of predetermined sparse elements may be used. Information outputted by the sparse element detection part 201 includes the input data itself.

The detection of the sparse element by the sparse element detection part 201 includes identifying and outputting a location(s) of an element(s) with value(s) matching the sparse element in the input data constituted by a plurality of values (location will hereinafter be referred to as sparse element location). Alternatively, detection of the sparse element by the sparse element detection part 201 may be an operation of identifying and outputting a location(s) of an element(s) with value(s) not matching the sparse element (location will hereinafter be referred to as non-sparse element location). Alternatively, detection by the sparse element detection part 201 may be identifying and outputting both the sparse element location(s) and the non-sparse element location(s).

The sparse location weight addition part 202 receives weights and the information outputted by the sparse element detection part 201 (for example, information about sparse element locations). Based on the information outputted by the sparse element detection part 201, the sparse location weight addition part 202 derives weight elements corresponding respectively to the sparse element locations from the weights acquired. In addition, the sparse location weight addition part 202 adds the derived weight elements by using the internal weight addition part 301 and outputs a sum of the weight elements. As described above, the sparse location weight addition part has a function of adding the weight elements corresponding to the sparse element. In other words, the sparse location weight addition part 202 acquires the weight elements to be multiplied by data determined by the sparse element locations (weight element will hereinafter be referred to as sparse location weight element) and outputs a sum of the weight elements.

A specific operation of the sparse location weight addition part 202 will be described.

In the convolutional operation example, when input data $X_{(is,js)}$ matches a sparse element, the sparse element location is (is, js), and the sparse location weight element can be expressed by $W_{(is,js)}$. In this example, the sparse location weight addition part 202 outputs $\Sigma W_{(is,js)}$ (where (is, js) is a sparse element location).

More specifically, the following describes a convolutional operation using input data illustrated in FIG. 3A and weights illustrated in FIG. 3B. In this case, when a sparse element is "−1", a location determined by the first row (is=1) and the first column (js=1) and the location determined by the second row (is=2) and the third column (js=3) of the input data are determined to be sparse element locations. Weight elements corresponding to these sparse element locations are determined to be "2" in the first row and the first column in FIG. 3B and "1" in the second row and the third column. In this case, the sparse location weight addition part 202 outputs 3 (2+1=3).

Referring back to FIG. 2, the multiplication part 203 functions a means that multiplies an output value of the sparse location weight addition part 202 by a sparse element. In the above convolutional operation example, the multiplication part 203 calculates ($a \times \Sigma W_{(is,js)}$) in which "a" is the sparse element. In the above example in FIGS. 3A and 3B, since the sparse element is "−1" and the sum of the weight elements is "3", the multiplication part 203 outputs "−3".

Out of weights, by using weights that do not correspond to the sparse element locations (which will hereinafter be referred to as non-sparse location weight element), the non-sparse data operation part 205 performs a multiply-add operation which is the same as one used in a DNN system that does not use sparsity, only for non-sparse elements and outputs a result. Namely, the non-sparse data operation part 205 performs an operation on the non-sparse elements, which are the elements other than the sparse element in the input data. More specifically, the non-sparse data operation part 205 iterates multiplication of a non-sparse element by a weight element corresponding thereto, for all the non-sparse elements included in the input data and adds results of each iterative multiplication.

The following describes an operation of the non-sparse data operation part 205 more specifically.

In the above convolutional operation example, the non-sparse data operation part 205 calculates $\Sigma(W_{(ins,jns)} \times X_{(ins,jns)})$ (where (ins, jns) is a non-sparse element location) to output a result. In the example in FIGS. 3A and 3B, the result of the multiply-add operation obtained by using values other than the sparse element locations (1st row and 1st column; 2nd row and 3rd column) and corresponding weight elements is outputted by the non-sparse data operation part 205. Specifically, 0×2+0×0+2×0+0×0+0×1+2×2+1×0=4 is an output of the non-sparse data operation part 205.

Referring back to FIG. 2, the addition part 204 is a means that adds an output of the multiplication part 203 and an output of the non-sparse data operation part 205 to output a sum of the outputs. In the above convolutional operation example, the addition part 204 outputs ($a \times W_{(is,js)}$)+ $\Sigma(W_{(ins,jns)} \times X_{(ins,jns)})$. Considering a=$X_{(is,js)}$, the above value is equivalent to $\Sigma(W_{(i,j)} \times X_{(i,j)})$, which is a convolutional operation without using the sparsity. In the example in FIGS. 3A and 3B, since the output of the multiplication part 203 is "−3" and the output of the non-sparse data operation part 205 is "4", the addition part 204 outputs "1" (the multiply-add operation part 10 outputs "1"). This result is equal to a value obtained by multiplying corresponding elements in the two matrixes illustrated in FIGS. 3A and 3B and adding the multiplication results.

The sparse location weight addition part 202 and the non-sparse data operation part 205 can be operated in parallel with each other. In this case, the number of multiply-add operations that need to be performed by the non-sparse data operation part 205 is the number of non-sparse elements, as a result an effect of reducing the number of multiplications can be maintained as in the case in which the sparse element value is zero. The sparse location weight addition part 202 is a means (a module) for performing only addition therein. Namely, since the sparse location weight addition part 202 does not perform any multiplication which needs a long operation time or a large circuit area in a computer and a circuit, a computation amount is less than that of the non-sparse data operation part 205.

While the multiplication part 203 performs multiplication, for example, since the multiplication part 203 performs multiplication only once in a single convolutional operation, the computation amount is small. For example, a case where i=3 and j=3 in the above convolutional operation $\Sigma(W_{(i,j)} \times X_{(i,j)})$ and all input data $X_{(i,j)}$ is equal to the sparse element a will be examined. In this case, nine multiply-add operations are needed originally. However, according to the first example embodiment, $a \times \Sigma W_{(is,js)}$ can be calculated by using the sparse location weight addition part 202 and the multiplication part 203, the convolutional operation can be completed by performing nine additions and one multiplication.

Figure 4:
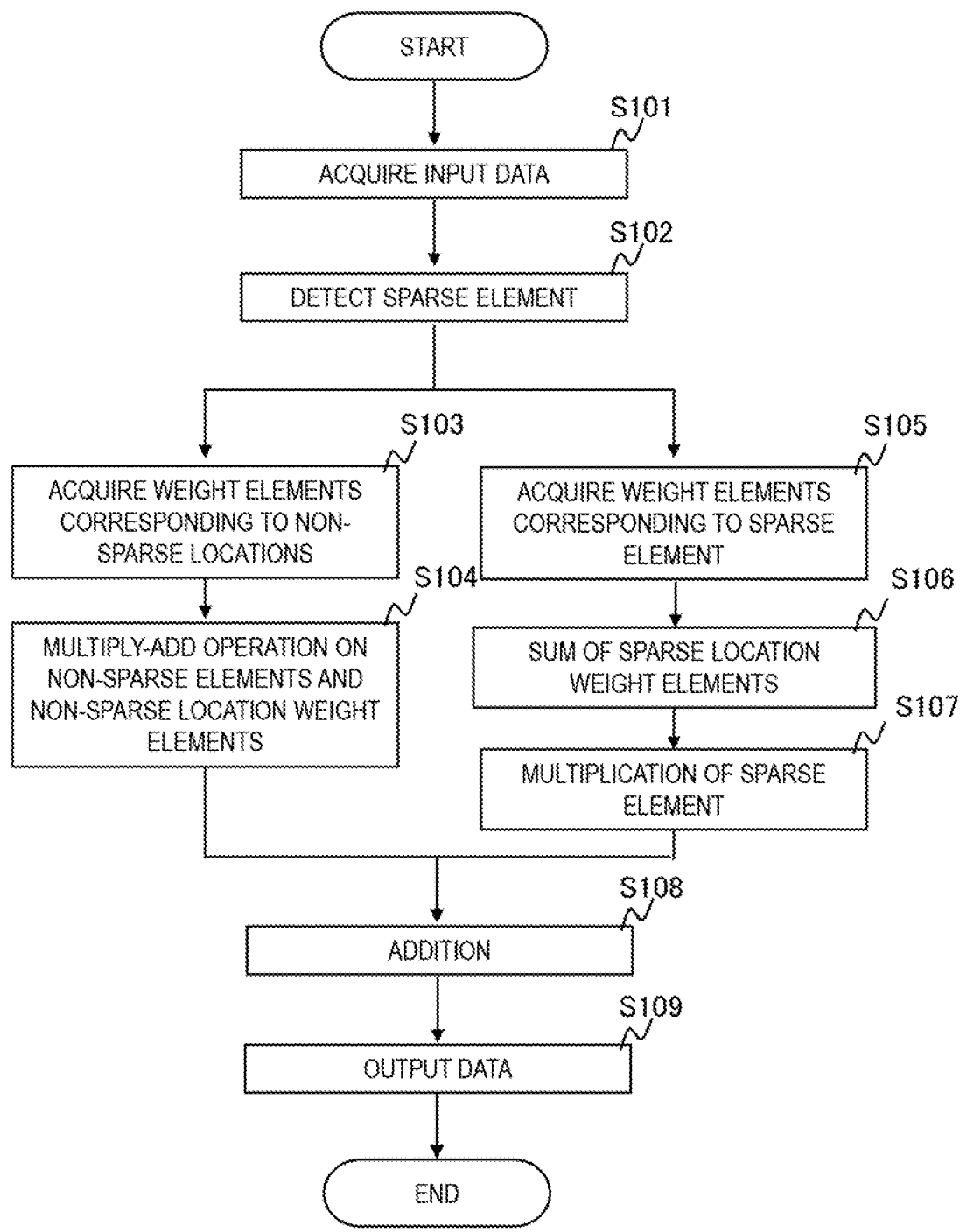
FIG. 4 is a flowchart illustrating an example of an operation of the multiply-add operation part according to the first example embodiment.

The following describes an operation of the multiply-add operation part 10 according to the first example embodiment with reference to a flowchart illustrated in FIG. 4.

In step S101, the sparse element detection part 201 gets input data.

Next, the sparse element detection part 201 detects a sparse element in the input data (step S102).

Next, by using non-sparse element locations and sparse element locations obtained by the detection, two kinds of processing are performed in parallel.

Specifically, by using the non-sparse element locations, the non-sparse data operation part 205 obtains weight elements corresponding to the non-sparse element locations (non-sparse location weight elements) (step S103).

Next, the non-sparse data operation part 205 performs a multiply-add operation on the non-sparse elements and the non-sparse location weight elements (step S104).

The sparse location weight addition part 202 acquires sparse location weight elements by using the sparse element locations (step S105).

Next, the weight addition part 301 in the sparse location weight addition part 202 calculates a sum of the sparse location weight elements (step S106).

Next, the multiplication part 203 multiplies the sum by the sparse element (step S107). Finally, the results of the two calculations performed in parallel are added and outputted. Namely, the addition part 204 adds the two results obtained in parallel and outputs a sum (steps S108 and S109).

[Variation]

Figure 5:
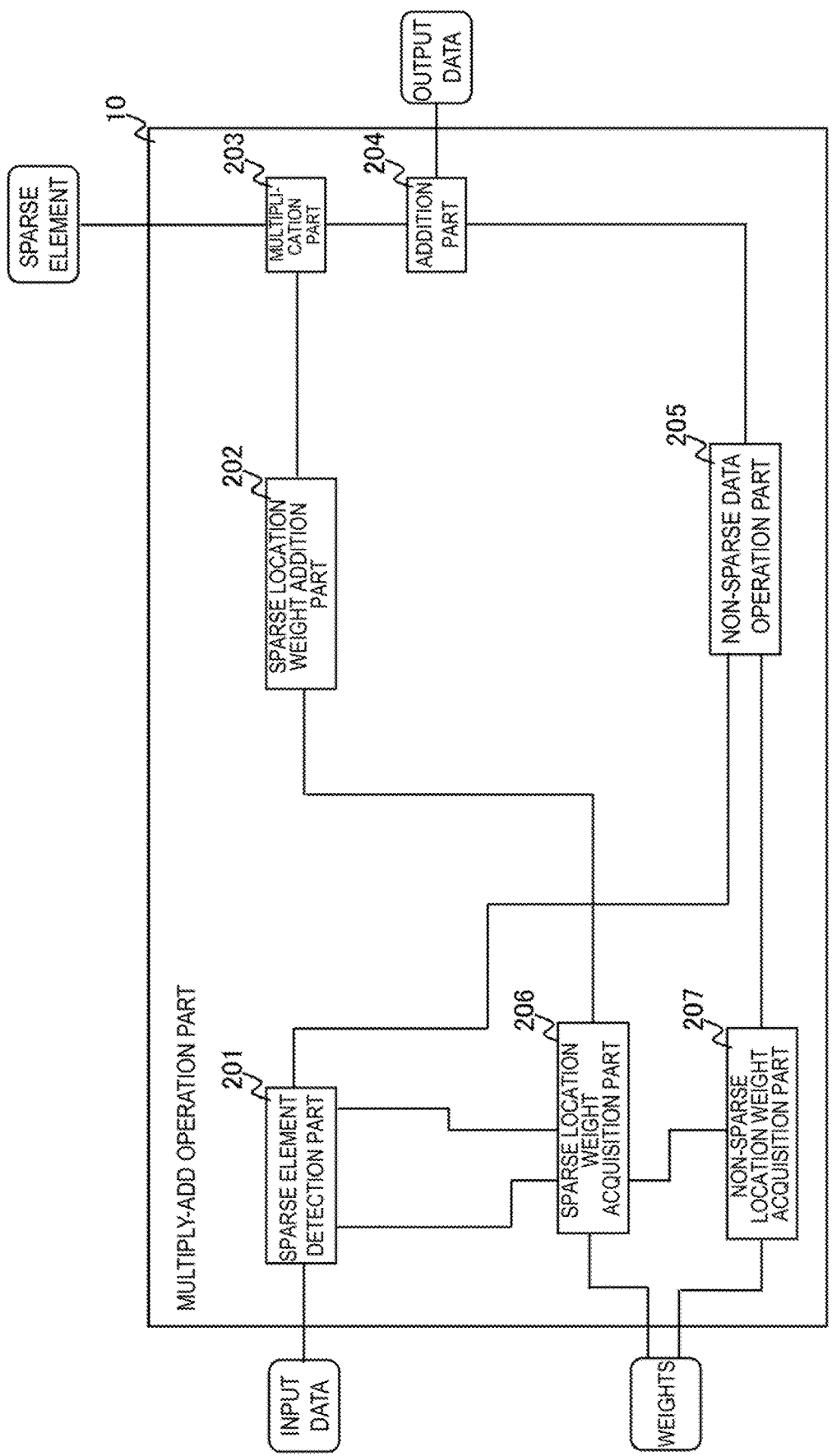
FIG. 5 is a diagram illustrating another example of the internal configuration of the multiply-add operation part included in the inference apparatus according to the first example embodiment.

The multiply-add operation part 10 illustrated in FIG. 2 is an example, and the configuration of the multiply-add operation part 10 is not limited to that illustrated in FIG. 2. For example, as illustrated in FIG. 5, the multiply-add operation part 10 may further include a sparse location weight acquisition part 206 and a non-sparse location weight acquisition part 207. The sparse location weight acquisition part 206 is a means that acquires, from the weights including sparse location weight elements and non-sparse location weight elements, the sparse location weight elements. The non-sparse location weight acquisition part 207 is means that acquires, from the weights including the sparse location weight elements and the non-sparse location weight elements, the non-sparse location weight elements.

More specifically, by using the information (for example, sparse element locations) outputted by the sparse element detection part 201, the sparse location weight acquisition part 206 acquires sparse location weight elements from the weights and outputs the acquired weight elements to the sparse location weight addition part 202. By using the information (for example, non-sparse element locations)

outputted by the sparse element detection part 201, the non-sparse location weight acquisition part 207 acquires the non-sparse location weight elements from the weights and outputs the acquired weight elements to the non-sparse data operation part 205. The sparse location weight addition part 202 and the non-sparse data operation part 205 may perform the above operations by using the respective weight elements acquired.

Figure 6:
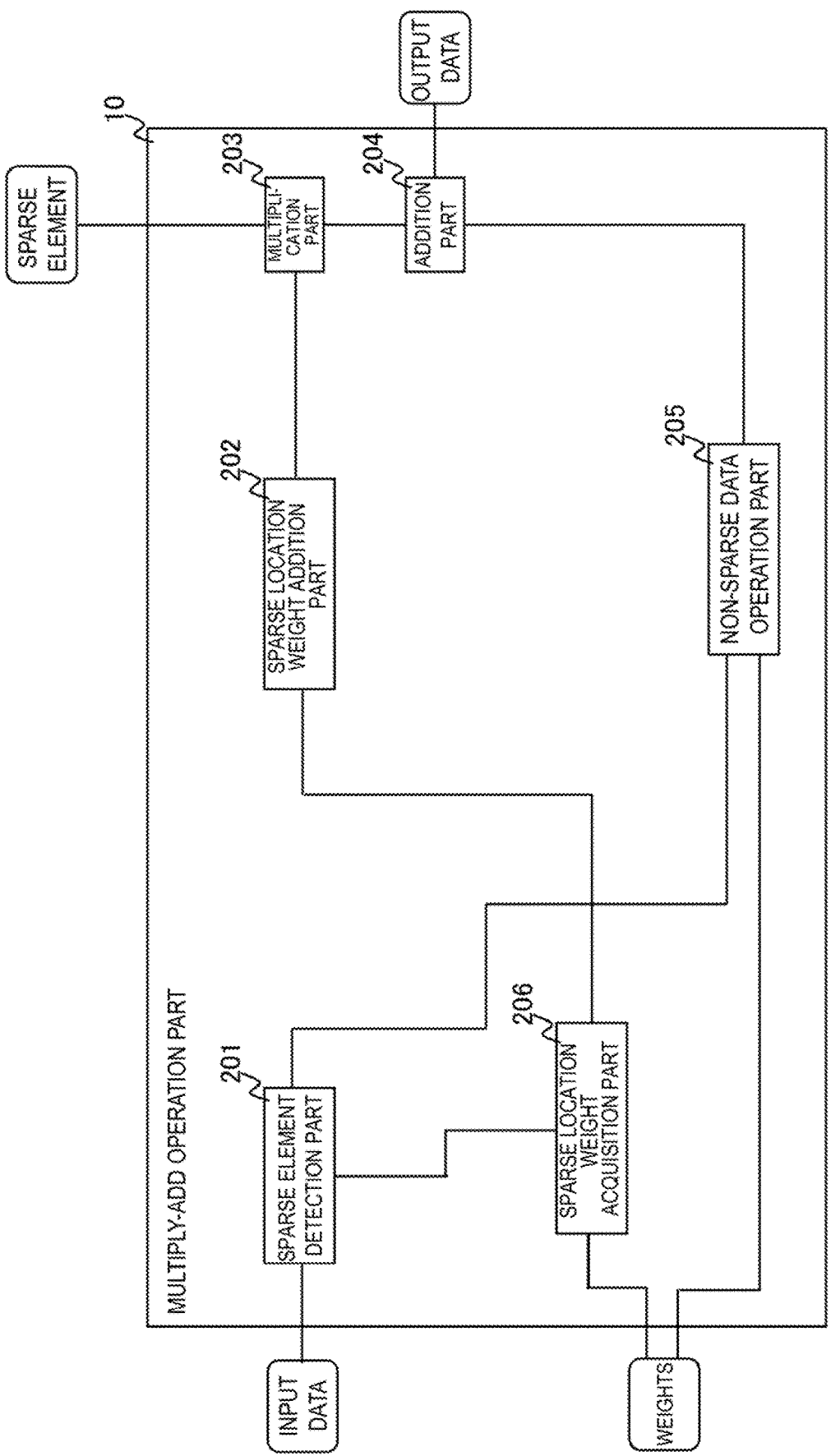
FIG. 6 is a diagram illustrating another example of the internal configuration of the multiply-add operation part included in the inference apparatus according to the first example embodiment.

Alternatively, as illustrated in FIG. 6, the multiply-add operation part 10 may not include the non-sparse location weight acquisition part 207 but may include only the sparse location weight acquisition part 206. That is, the function of the non-sparse location weight acquisition part 207 may be included in the non-sparse data operation part 205.

According to the first example embodiment, in a DNN system using a non-zero sparse element, the number of multiply-add operations on the non-sparse elements can be reduced as with a DNN system that uses the sparse element (i.e., the element value is zero) disclosed in NPL 1, etc., for example. In addition to this reduction, according to the first example embodiment, a smaller number of multiplications are performed in the multiply-add operations on the non-zero sparse elements, which are not taken into consideration in NPL 1, etc. Thus, the total number of necessary multiply-add operations can be reduced, and time and circuit area required for performing the operations can be reduced.

Second Example Embodiment

Next, a second example embodiment will be described in detail with reference to drawings.

Figure 7:
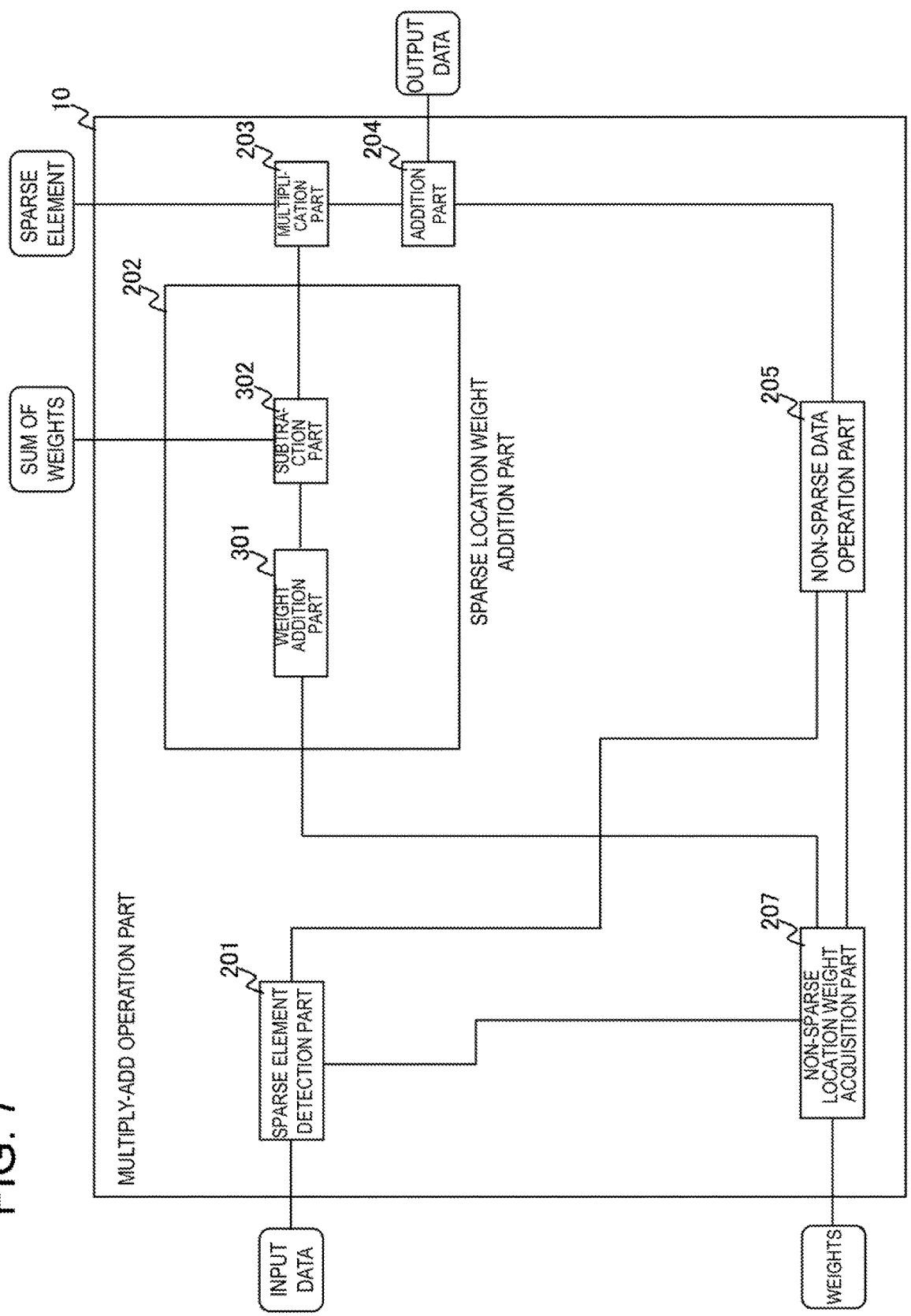
FIG. 7 is a diagram illustrating an example of an internal configuration of a multiply-add operation part included in an inference apparatus according to a second example embodiment.

FIG. 7 is a diagram illustrating an example of an internal configuration of a multiply-add operation part 10 included in an inference apparatus according to a second example embodiment. As illustrated in FIG. 7, the multiply-add operation part 10 according to the second example embodiment includes a sparse element detection part 201, a sparse location weight addition part 202, a multiplication part 203, an addition part 204, a non-sparse data operation part 205, and a non-sparse location weight acquisition part 207. In addition, the sparse location weight addition part 202 includes a weight addition part 301 and a subtraction part 302.

As is clear from the comparison between FIGS. 2 and 7, the first and second example embodiments are different in an internal configuration of the sparse location weight addition part 202. The description of the content of the non-sparse location weight acquisition part 207 illustrated in FIG. 7 will be omitted since the content is the same as that described with reference to FIG. 5.

The following outlines an operation of the sparse location weight addition part 202 according to the second example embodiment.

The weight addition part 301 is a means that calculates a sum of the non-sparse location weight elements outputted by the non-sparse location weight acquisition part 207. More specifically, the weight addition part 301 receives outputs of the non-sparse location weight acquisition part 207 and calculates a total value of the received values. Namely, in the above convolutional operation example, the weight addition part 301 calculates $\Sigma W_{(ins,jns)}$ (where (ins, jns) is an individual non-sparse location).

The subtraction part 302 is a means that subtracts the output of the weight addition part 301 from a sum of the sparse location weight elements and the non-sparse location weight elements. More specifically, the subtraction part 302 subtracts the output value of the weight addition part 301 from the sum of the weights externally inputted. Herein, the sum of the weights is expressed by the following expression (2).

$$W_{sum} = \Sigma W_{(i,j)} \qquad (2)$$

In the expression (2), (i, j) includes a sparse location (is, js) and a non-sparse location (ins, jns).

According to the above expression (2), the subtraction part 302 calculates $(W_{sum} - \Sigma W_{(ins,jns)})$. The result obtained by the subtraction part 302 matches the output value of the sparse location weight addition part 202 in the multiply-add operation part 10 according to the first example embodiment. According to the first example embodiment, the sum of the weights corresponding to the sparse locations is calculated directly. In contrast, according to the second example embodiment, the sum of the weights corresponding to the sparse locations is calculated indirectly by subtracting the sum of the weights corresponding to the non-sparse locations from the sum of all the weights.

Figure 8:
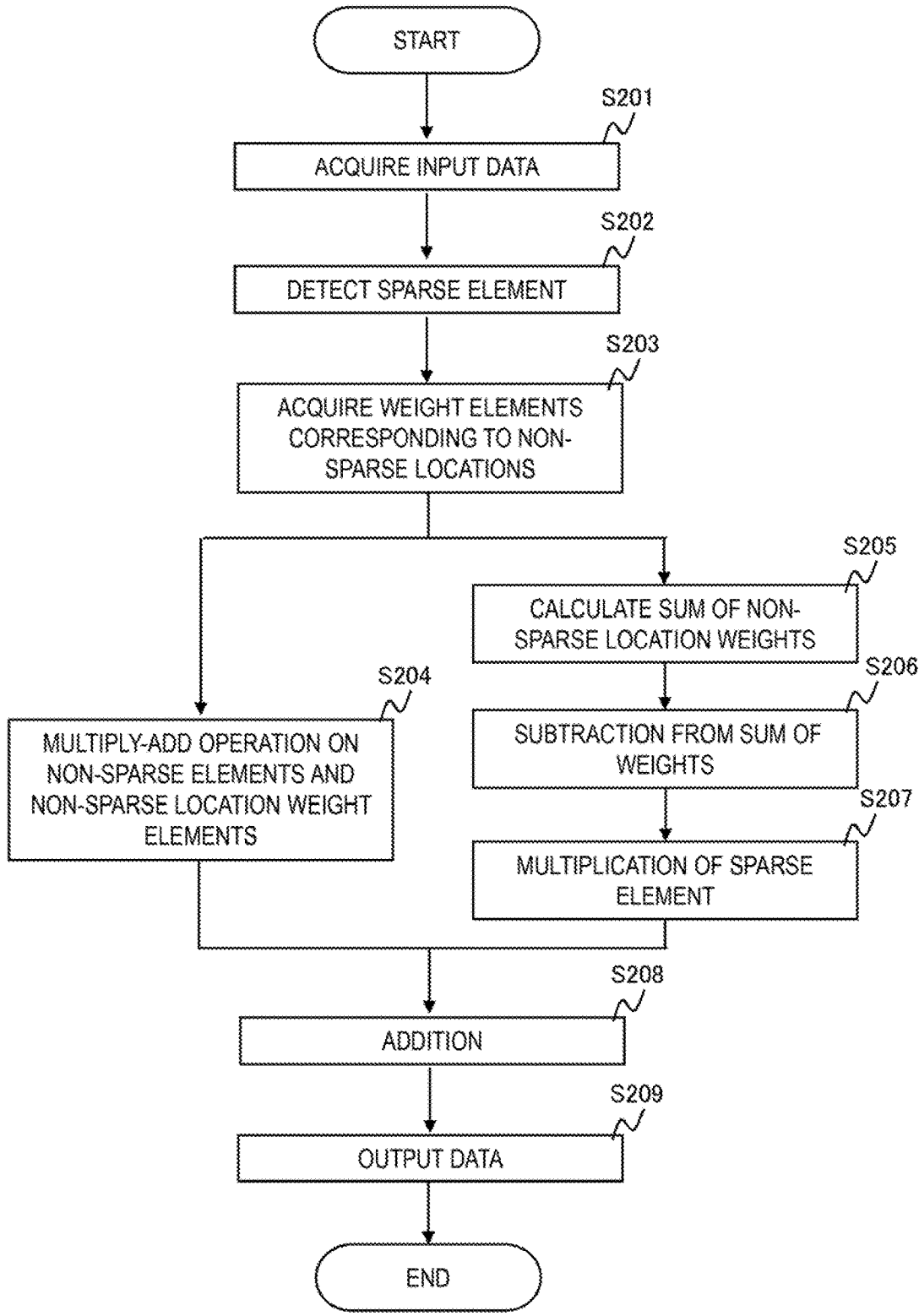
FIG. 8 is a flowchart illustrating an example of an operation of the multiply-add operation part according to the second example embodiment.

The following describes an operation according to the second example embodiment with reference to a flowchart illustrated in FIG. 8.

In step S201, the sparse element detection part 201 gets input data.

Next, the sparse element detection part 201 detects a sparse element in the input data (step S202).

Next, based on the non-sparse element locations detected by the detection in the previous step, the non-sparse location weight acquisition part 207 acquires the non-sparse location weight elements (step S203).

Next, two kinds of processing are performed in parallel.

In step S204, the non-sparse data operation part 205 performs a multiply-add operation on the non-sparse elements and the non-sparse location weight elements.

In step S205, the weight addition part 301 in the sparse location weight addition part 202 calculates a sum of the non-sparse location weight elements.

In step S206, the subtraction part 302 in the sparse location weight addition part 202 subtracts the sum from a sum of the weights acquired by the subtraction part 302.

Next, in step S207, the multiplication part 203 multiplies the output value of the sparse location weight addition part 202 by the sparse element.

The addition part 204 adds results of the above two calculations performed in parallel (step S208) and outputs a sum (step S209).

According to the second example embodiment, the sparse location weight addition part 202 does not acquire the sparse location weight elements. Thus, the time needed to acquire the weight elements can be reduced. For example, in a hardware circuit, there are cases in which the weights are stored in a storage element such as a memory and the weight elements are acquired by reading the weights from the memory. For example, assuming that a memory from which the weight values can only be read sequentially one by one is used and that the non-sparse data operation part 205 and the sparse location weight addition part 202 can perform sufficiently fast processing, since the sparse location weight addition part 202 cannot acquire the corresponding weights used as its inputs while the non-sparse location weight elements are being read, the sparse location weight addition part 202 needs to wait. In contrast, since the non-sparse data operation part 205 cannot acquire the corresponding weights used as its inputs while the sparse location weight elements are being read, the non-sparse data operation part 205 needs to wait.

Thus, there are cases in which one of the two processing parts needs to wait for its input data and cannot perform sufficiently fast processing. Regarding the above problem attributable to the memory reading, since both the non-sparse data operation part 205 and the sparse location weight addition part 202 according to the second example embodiment perform their respective calculations by using the same non-sparse location weight elements, these parts 205 and 202 do not need to wait for their input data. That is, the above problem attributable to the memory reading can be solved, and faster processing can be achieved.

In addition, according to the second example embodiment, even when non-zero sparse elements are used, faster processing equivalent to that achieved when zero sparse elements are used can be realized. This is because, the calculation using the weights corresponding to the sparse element that occurs when the sparse element is not zero can be omitted by previously acquiring the sum of the weights.

Third Example Embodiment

The following describes a third example embodiment in detail with reference to drawings.

Figure 9:
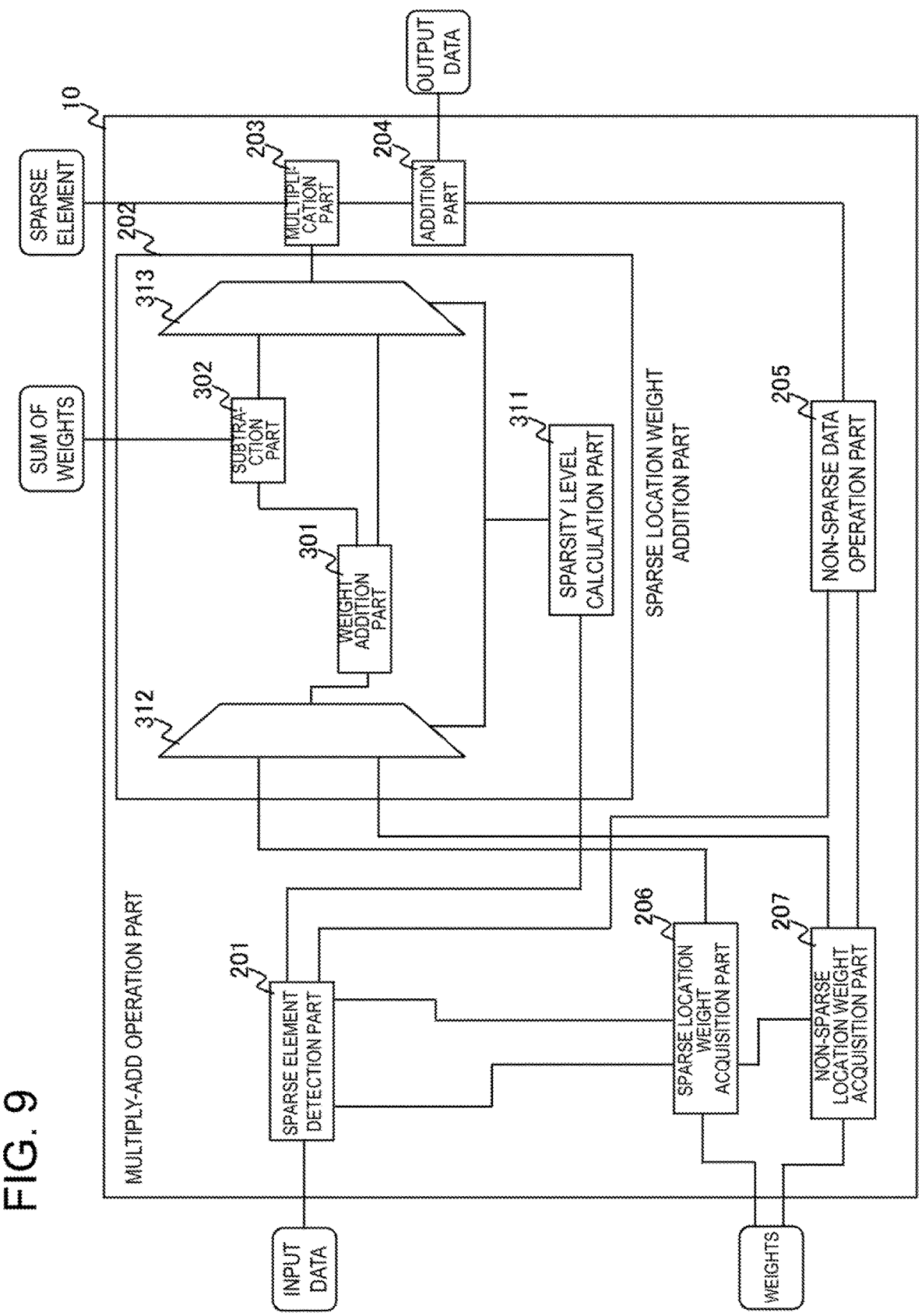
FIG. 9 is a diagram illustrating an example of an internal configuration of a multiply-add operation part included in an inference apparatus according to a third example embodiment.

FIG. 9 is a diagram illustrating an example of an internal configuration of a multiply-add operation part 10 included in an inference apparatus according to a third example embodiment. As illustrated in FIG. 9, the multiply-add operation part 10 according to the third example embodiment includes a sparse element detection part 201, a sparse location weight addition part 202, a multiplication part 203, an addition part 204, and a non-sparse data operation part 205. The multiply-add operation part 10 according to the third example embodiment further includes a sparse location weight acquisition part 206 and a non-sparse location weight acquisition part 207. The sparse location weight addition part 202 includes a sparsity level calculation part 311, a weight selection part 312, a result selection part 313, a weight addition part 301, and a subtraction part 302.

As is clear from the comparison between FIGS. 2 and 7 and FIG. 9, the third example embodiment is different from the first and second example embodiments in the internal configuration of the sparse location weight addition part 202. Regarding the sparse location weight acquisition part 206 and the non-sparse location weight acquisition part 207 illustrated in FIG. 9, since there is no difference from those described with reference to FIG. 5, the description thereof will be omitted.

The following outlines an operation of the sparse location weight addition part 202 according to the third example embodiment.

The sparsity level calculation part 311 is a means that calculates a ratio of a sparse element included in the input data, as a sparsity level. More specifically, by using an output of the sparse element detection part 201, the sparsity level calculation part 311 calculates a ratio (i.e., a sparsity level) of the sparse element with respect to one input data. For example, in the above convolutional operation example, when i=3 and j=3, a ratio of the sparse element with respect to nine input data values is calculated.

The weight selection part 312 is a means that selects and outputs, based on the calculated sparsity level, sparse location weight elements outputted by the sparse location weight acquisition part 206 or non-sparse location weight elements outputted by the non-sparse location weight acquisition part 207. More specifically, the weight selection part 312 determines whether the above sparsity level is larger than a predetermined value (a threshold), selects the non-sparse location weight elements or the sparse location weight elements, and enters the selected weight elements to the weight addition part 301. For example, 0.5 (sparsity level 50%) or the like may be used as the above predetermined value.

The weight addition part 301 is a means that calculates a sum of weight elements outputted by the weight selection part 312. That is, the weight addition part 301 calculates a sum of the sparse location weight elements or the non-sparse location weight elements outputted by the weight selection part 312.

The subtraction part 302 subtracts the output of the weight addition part 301 from the sum of the weights, as in the second example embodiment.

The result selection part 313 outputs either one out of the output of the weight addition part 301 and the output of the subtraction part 302, based on the above sparsity level. That is, the result selection part 313 selects and outputs a result by using the same value used by the weight selection part 312, based on the sparsity level.

Figure 10:
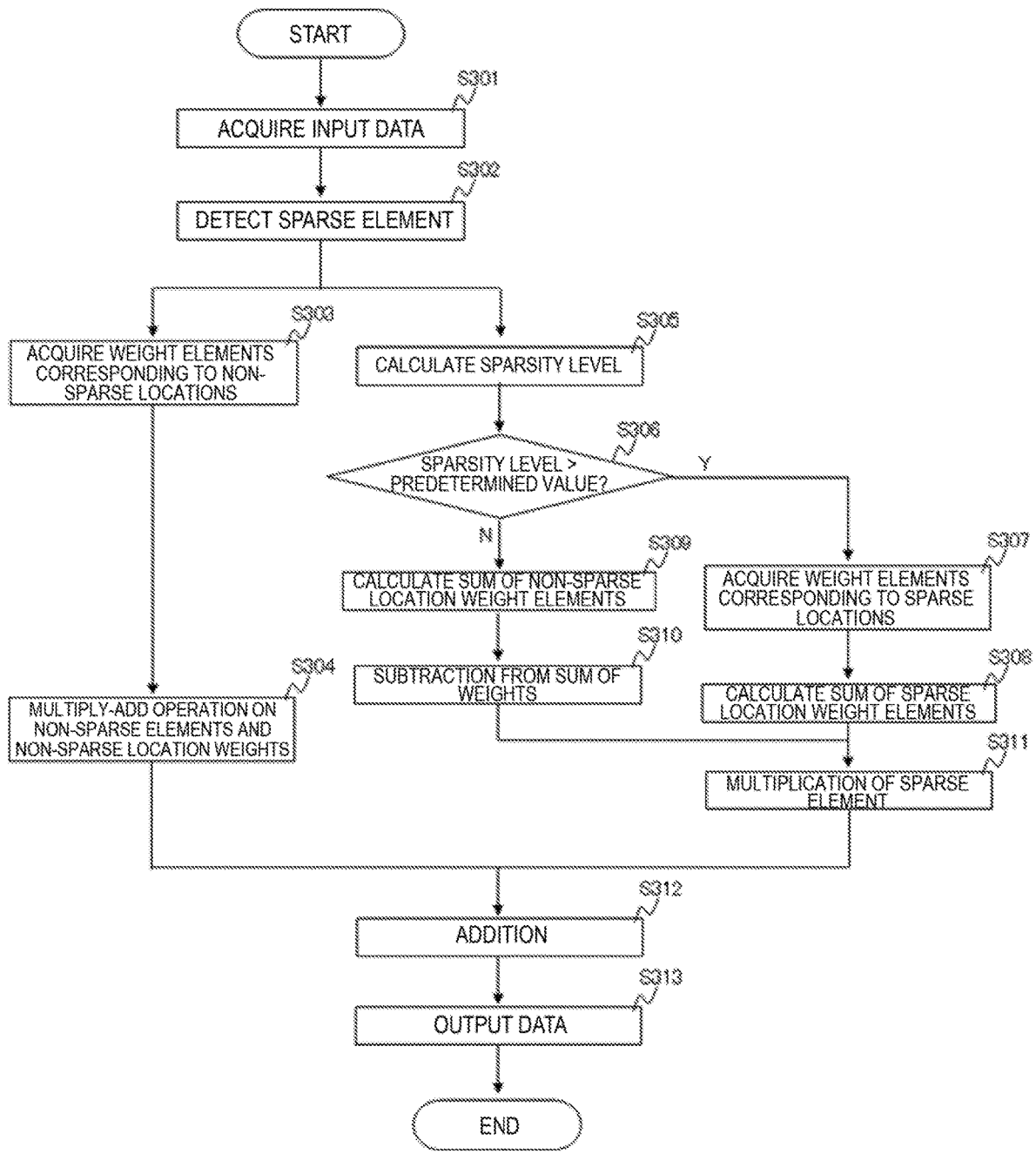
FIG. 10 is a flowchart illustrating an example of an operation of the multiply-add operation part according to the third example embodiment.

The following describes an operation according to the third example embodiment with reference to a flowchart illustrated in FIG. 10.

In step S301, the sparse element detection part 201 gets input data.

Next, the sparse element detection part 201 detects a sparse element included in the input data (step S302).

The non-sparse location weight acquisition part 207 acquires non-sparse location weight elements by using the non-sparse element locations obtained by the detection in the previous stage (step S303). The non-sparse location weight elements are outputted to the non-sparse data operation part 205.

Next, the non-sparse data operation part 205 performs a multiply-add operation on the non-sparse elements and the non-sparse location weight elements (step S304).

In parallel to this processing, the sparsity level calculation part 311 in the sparse location weight addition part 202 calculates the sparsity level based on the input data (step S305).

Based on the calculated sparsity level, the weight selection part 312 determines whether the sparsity level is larger than a predetermined value (i.e., 0.5; sparsity level 50%). If so, the weight selection part 312 acquires the sparse location weight elements (step S306, Yes branch; step S307).

Then, the weight addition part 301 calculates a sum of the sparse location weight elements (step S308).

If the sparsity level is equal to or less than the predetermined value (step S306, No branch), the weight addition part 301 calculates a sum of the non-sparse location weight elements (step S309).

Next, the subtraction part 302 subtracts the sum from the sum of the weights (step S310).

The multiplication part 203 multiplies an output value of the sparse location weight addition part 202 by the sparse element (step S311).

The addition part 204 adds results of the above two calculations performed in parallel (step S312) and outputs a sum (step S313).

According to the third example embodiment, the sparse location weight addition part 202 performs the calculation using the sparse location weight elements or the calculation using the non-sparse location weight elements, depending on the sparsity level. As a result, an upper limit of the number of additions needed by the sparse location weight addition part 202 when the number of non-sparse elements in the input data is large can be reduced. For example, when the above predetermined value is 0.5, the number of additions performed by the weight addition part 301 can be reduced to half of the number of all the weights (half of the number of all the weights+1 when the number of all the weights is an odd number).

The following describes a hardware configuration of the inference apparatus according to any one of the first to third example embodiments.

Figure 11:
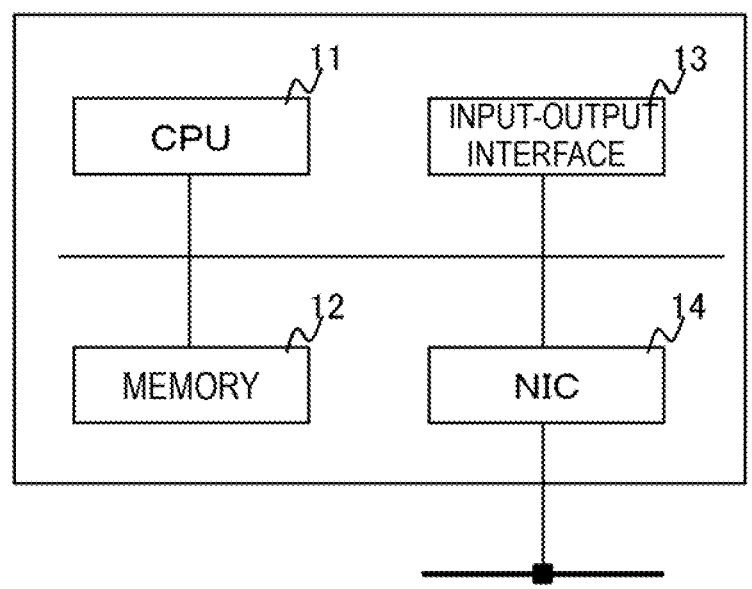
FIG. 11 is a diagram illustrating an example of a hardware configuration of an inference apparatus.
Figure 12:
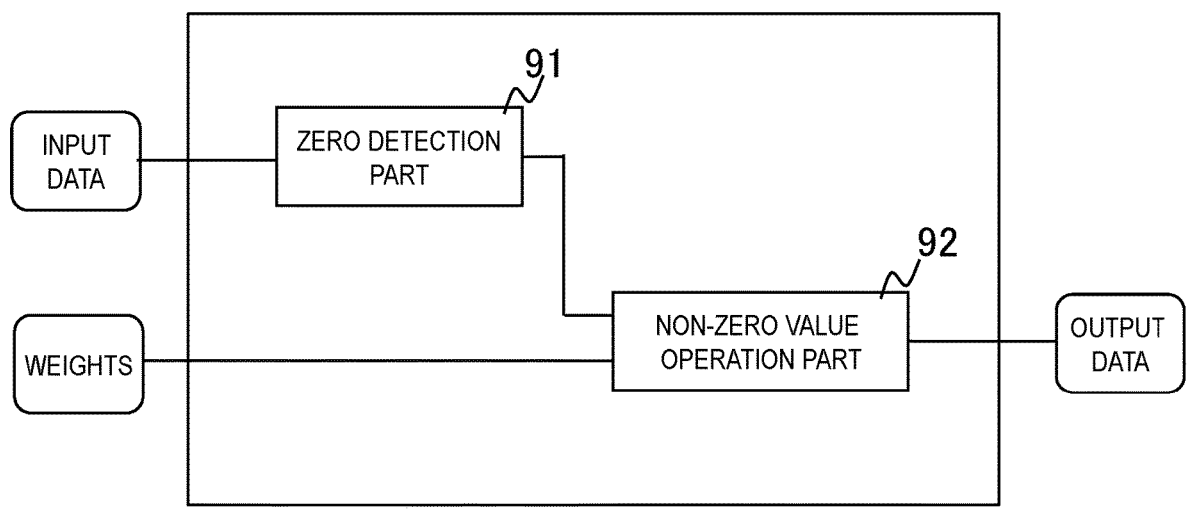
FIG. 12 is a diagram illustrating a technology disclosed in NPL 1.
Figure 13:
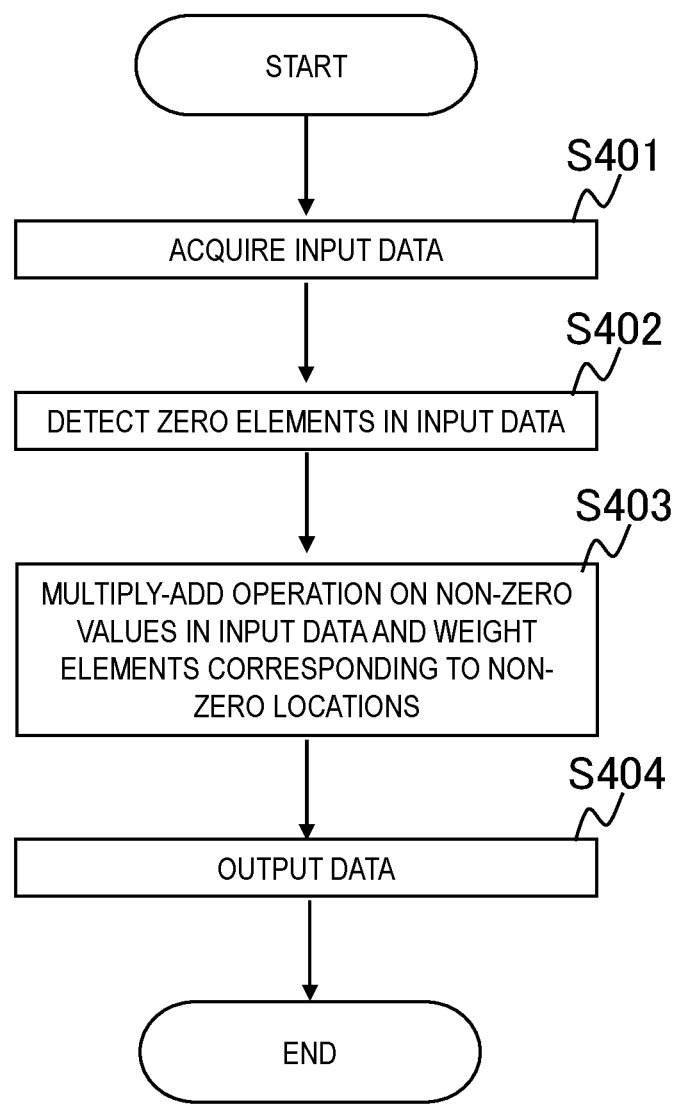
FIG. 13 is a flowchart illustrating an operation of the technology disclosed in NPL 1.
Figure 14A:
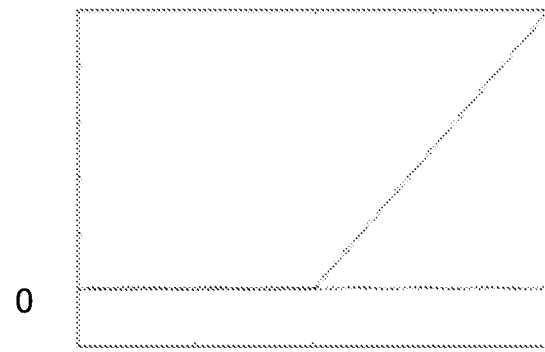
FIGS. 14A-14C illustrate various kinds of activation functions.
Figure 14B:
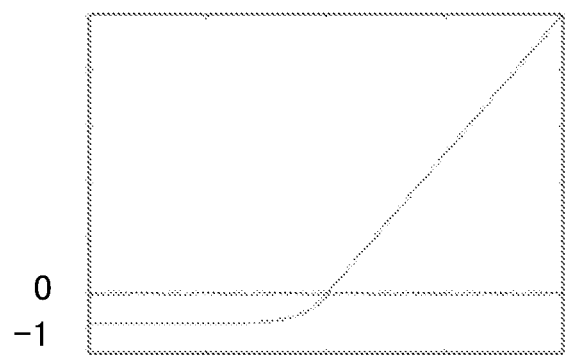
Figure 14C:
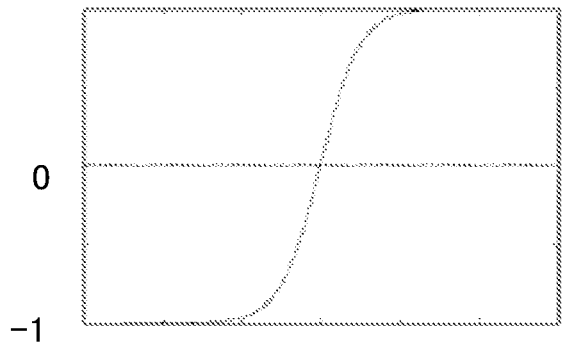

FIG. 11 is a diagram illustrating an example of a hardware configuration of the inference apparatus. The inference apparatus may be configured by an information processing apparatus (a computer) and has a configuration illustrated in FIG. 11. For example, the inference apparatus includes a central processing unit (CPU) 11, a memory 12, an input-output interface 13, and a network interface card (NIC) 14 serving as communication means, all of which are connected to each other via an internal bus.

The hardware configuration of the inference apparatus is not limited to the configuration illustrated in FIG. 11. The inference apparatus may include hardware not illustrated in FIG. 11. The inference apparatus may be configured without the NIC 14 if appropriate. Alternatively, for example, the number of CPUs included in the inference apparatus is not limited to the example in FIG. 11. For example, the inference apparatus may include a plurality of CPUs.

The memory 12 may be a random access memory (RAM), a read-only memory (ROM), or an auxiliary storage device (a hard disk or the like).

The input-output interface 13 is a means that serves as an interface for a display apparatus or an input apparatus not illustrated. The display apparatus is, for example, a liquid crystal display. The input apparatus is, for example, an apparatus that receives user operations such as a keyboard or a mouse.

The functions of the inference apparatus are realized by the above processing modules. For example, the processing modules are realized by causing the CPU 11 to execute a program stored in the memory 12. This program may be updated by downloading a program via a network or by using a storage medium in which a program is stored. The above processing modules may be realized by a semiconductor chip. Namely, the functions performed by the above processing modules may be realized by execution of software by some hardware.

While the industrial applicability of the present invention is clear from the above description, the present invention is suitably applicable to technical fields such as image recognition, character recognition, and language recognition using deep learning.

The above example embodiments can partially or entirely be noted (but not limited to) as the following modes.

[Mode 1]

See the information processing apparatus according to the above first aspect.

[Mode 2]

The information processing apparatus preferably according to mode 1, further including a sparse location weight acquisition part that acquires the first weight elements from weights including the first weight element.

[Mode 3]

The information processing apparatus preferably according to mode 2, wherein the sparse location weight addition part calculates a sum of the first weight elements outputted by the sparse location weight acquisition part.

[Mode 4]

The information processing apparatus preferably according to mode 1, further including a non-sparse location weight acquisition part that acquires second weight elements corresponding to the non-sparse elements from weights including the first weight elements and the second weight elements.

[Mode 5]

The information processing apparatus preferably according to mode 4, wherein the sparse location weight addition part includes:

a weight addition part that calculates a sum of the second weight elements outputted by the non-sparse location weight acquisition part; and a subtraction part that subtracts an output of the weight addition part from a sum of the first and second weight elements.

[Mode 6]

The information processing apparatus preferably according to mode 1, further including:

a sparse location weight acquisition part that acquires the first weight elements from weights including the first weight elements and a second weight elements corresponding to the non-sparse elements; and a non-sparse location weight acquisition part that acquires the second weight elements from the weights.

[Mode 7]

The information processing apparatus preferably according to mode 6, wherein the sparse location weight addition part includes:

a sparsity level calculation part that calculates a ratio of the sparse element included in the input data as a sparsity level;

a weight selection part selects and outputs the first weight elements outputted by the sparse location weight acquisition part or the second weight elements outputted by the non-sparse location weight acquisition part, based on the sparsity level;

a weight addition part that calculates a sum of the first weight elements or the second weight element(s) outputted by the weight selection part;

a subtraction part that subtracts an output of the weight addition part from a sum of the first and second weight elements; and a result selection part that outputs the output of the weight addition part or an output of the subtraction part, based on the sparsity level.

[Mode 8]

The information processing apparatus preferably according to any one of modes 1 to 7, wherein the non-sparse data operation part multiplies a non-sparse element by a weight element corresponding to the non-sparse element for all the non-sparse elements included in the input data and adds results obtained by the multiplications.

[Mode 9]

See the information processing method according to the above second aspect.

[Mode 10]

See the program according to the above third aspect.

Modes 9 and 10 can be expanded in the same way as mode 1 is expanded to modes 2 to 8.

The disclosure of the above NPL 1 is incorporated herein by reference thereto. Variations and adjustments of the example embodiments and examples are possible within the scope of the overall disclosure (including the claims) of the present invention and based on the basic technical concept of the present invention. Various combinations and selections of various disclosed elements (including the elements in each of the claims, example embodiments, examples, drawings, etc.) are possible within the scope of the overall disclosure of the present invention. Namely, the present invention of course includes various variations and modifications that could be made by those skilled in the art according to the overall disclosure including the claims and the technical concept. The description discloses numerical value ranges. However, even if the description does not particularly disclose arbitrary numerical values or small ranges included in the ranges, these values and ranges should be deemed to have been specifically disclosed.

What is claimed is:

1. An information processing apparatus, comprising:
a processor; and
a memory in circuit communication with the processor, wherein the processor is configured to execute program instructions stored in the memory to execute:
a sparse element detection process that detects a predetermined sparse element from input data and outputs information about the sparse element;
a sparse location weight addition process that adds a plurality of first weight elements, each corresponding to each location of the sparse element in the input data;
a multiplication process that multiplies an output of the sparse location weight addition process by the sparse element;
a non-sparse data operation process that performs an operation on a plurality of non-sparse elements, each being an element other than the sparse element in the input data; and
an addition process that adds an output of the multiplication process and an output of the non-sparse data operation process.

2. The information processing apparatus according to claim 1, wherein the processor is configured to execute the program instructions stored in the memory to execute
a sparse location weight acquisition process that acquires based on the information outputted by the sparse element detection process, the plurality of first weight elements, from weights received, the weights including the plurality of first weight elements.

3. The information processing apparatus according to claim 2, wherein the processor is configured to execute the program instructions stored in the memory to, as the sparse location weight addition calculate a sum of the plurality of first weight elements outputted by the sparse location weight acquisition process.

4. The information processing apparatus according to claim 1, wherein the processor is configured to execute the program instructions stored in the memory to execute
a non-sparse location weight acquisition process that acquires a plurality of second weight elements corresponding to locations of the plurality of non-sparse elements in the input data from weights including the plurality of first weight elements and the plurality of second weight elements.

5. The information processing apparatus according to claim 4, wherein the processor is configured to execute the program instructions stored in the memory to execute the sparse location weight addition process including:
a weight addition process that calculates a sum of the plurality of second weight elements outputted by the non-sparse location weight acquisition process; and
a subtraction process that subtracts an output of the weight addition process from a sum of the plurality of first weight elements and the plurality of second weight elements.

6. The information processing apparatus according to claim 1, wherein the processor is configured to execute the program instructions stored in the memory to execute:
a sparse location weight acquisition process that acquires the plurality of first weight elements from weights including the plurality of first weight elements and the plurality of second weight elements, each of the second weight elements corresponding to each of the non-sparse elements; and
a non-sparse location weight acquisition process that acquires the plurality of second weight element from the weights.

7. The information processing apparatus according to claim 6, wherein the processor is configured to execute the program instructions stored in the memory to execute the sparse location weight addition process including:
a sparsity level calculation process that calculates a ratio of the sparse element included in the input data as a sparsity level;
a weight selection process that selects and outputs the plurality of first weight elements outputted by the sparse location weight acquisition process or the plurality of second weight elements outputted by the non-sparse location weight acquisition process, based on the sparsity level;
a weight addition process that calculates a sum of the plurality of first weight elements or the plurality of second weight elements outputted by the weight selection process;
a subtraction process that subtracts an output of the weight addition process from a sum of the plurality of first weight elements and the plurality of second weight elements; and
a result selection process that outputs the output of the weight addition process or an output of the subtraction process, based on the sparsity level.

8. The information processing apparatus according to claim 1, wherein the processor is configured to execute the program instructions stored in the memory to execute
the non-sparse data operation process that iterates multiplication of a non-sparse element by a weight element corresponding to the non-sparse element for all the non-sparse elements included in the input data and adds results obtained by iteration of the multiplication.

9. An information processing method comprising:
detecting a predetermined a sparse element from input data and outputting information about the sparse element;
adding a plurality of first weight elements corresponding to the sparse element;
multiplying a sum of the plurality of first weight elements by the sparse element;
performing an operation on a plurality of non-sparse elements, each being an element other than the sparse element in the input data; and
adding a multiplication result of a sum of the plurality of first weight elements and the sparse element and an operation result on the plurality of non-sparse elements.

10. A non-transitory computer readable medium storing therein a program causing a computer to execute processing comprising:
detecting a predetermined a sparse element from input data and outputting information about the sparse element;
adding a plurality of first weight elements corresponding to the sparse element;

multiplying a sum of the plurality of first weight elements by the sparse element;

performing an operation on a plurality of non-sparse elements, each being an element other than the sparse element in the input data; and adding a multiplication result of a sum of the plurality of first weight elements and the sparse element and an operation result on the plurality of non-sparse elements.

11. The information processing apparatus according to claim 1, wherein the processor is configured to execute the program instructions stored in the memory to execute at least the sparse location weight addition process and the multiplication process, in parallel with the non-sparse data operation process.

12. The information processing apparatus according to claim 5, wherein the processor is configured to execute the program instructions stored in the memory to execute the weight addition process, the subtraction process, and the multiplication process, in parallel with the non-sparse data operation process.

13. The information processing apparatus according to claim 4, wherein the processor is configured to execute the program instructions stored in the memory to execute the addition process that outputs $$(a \times \Sigma W_{(is,js)}) + \Sigma(W_{(ins,jns)} \times X_{(ins,jns)})$$

where $a$ is the sparse element in the input data, $W(is,js)$ is the first weight element at a location $(is,js)$ of the wrights represented by a matrix W, the location $(is,js)$ corresponding to a location of the sparse element $a$ in the input data represented by a matrix X, and $W(ins,jns)$ is the second weight element at a location $(ins,jns)$ of the wrights represented by the matrix W, the location $(ins,jns)$ corresponding to a location of the non-sparse element in the input data represented by the matrix X $(ins,jns)$.

14. The information processing apparatus according to claim 4, wherein the processor is configured to execute the program instructions stored in the memory to execute the subtraction process that outputs $$\Sigma W_{(i,j)} - \Sigma W_{(ins,jns)}$$

where $W(i,j)$ is an element at a location $(i,j)$ of the weights represented by a matrix W, the location $(i,j)$ corresponding to a location $(i,j)$ including a location of the sparse element and a location of a non-sparse element in the input data represented by the matrix X, and $W(ins,jns)$ is the second weight element at a location $(ins,jns)$ of the wrights represented by the matrix W, the location $(ins,jns)$ corresponding to a location of the non-sparse element in the input data represented by the matrix X $(ins,jns)$.

15. The information processing method according to claim 9, comprising:

acquiring based on the information about the sparse element, the plurality of first weight elements, from weights received, the weights including the plurality of first weight elements.

16. The information processing method according to claim 9, comprising acquiring a plurality of second weight elements corresponding to locations of the plurality of non-sparse elements in the input data from weights including the plurality of first weight elements and the plurality of second weight elements.

17. The information processing method according to claim 16, comprising:

calculating a sum of the plurality of second weight elements; and subtracting the sum of the plurality of second weight elements from a sum of the plurality of first weight elements and the plurality of second weight elements.

18. The non-transitory computer readable medium according to claim 10, storing therein the program causing a computer to execute processing comprising acquiring, based on the information about the sparse element, the plurality of first weight elements, from weights received, the weights including the plurality of first weight elements.

19. The non-transitory computer readable medium according to claim 10, storing therein the program causing a computer to execute processing comprising acquiring a plurality of second weight elements corresponding to locations of the plurality of non-sparse elements in the input data from weights including the plurality of first weight elements and the plurality of second weight elements.

20. The non-transitory computer readable medium according to claim 10, storing therein the program causing a computer to execute processing comprising:

calculating a sum of the plurality of second weight elements; and subtracting the sum of the plurality of second weight elements from a sum of the plurality of first weight elements and the plurality of second weight elements.

* * * * *